(12) United States Patent
Tonegawa (10) Patent No.: US 9,225,013 B2
(45) Date of Patent: Dec. 29, 2015

(54) METHOD FOR PRODUCING CATHODE-ACTIVE MATERIAL FOR LITHIUM SECONDARY BATTERY

(75) Inventor: Akihisa Tonegawa, Yokohama (JP)

(73) Assignee: SHOWA DENKO K.K., Tokyo (JP)

( * ) Notice: Subject to any disclaimer, the term of this patent is extended or adjusted under 35 U.S.C. 154(b) by 288 days.

(21) Appl. No.: 14/112,143

(22) PCT Filed: Apr. 16, 2012

(86) PCT No.: PCT/JP2012/060289
§ 371 (c)(1),
(2), (4) Date: Oct. 16, 2013

(87) PCT Pub. No.: WO2012/144469
PCT Pub. Date: Oct. 26, 2012

(65) Prior Publication Data
US 2014/0042372 A1    Feb. 13, 2014

(30) Foreign Application Priority Data

Apr. 22, 2011   (JP) .................................. 2011-096280

(51) Int. Cl.
| | |
|---|---|
| *H01M 4/88* | (2006.01) |
| *H01M 4/36* | (2006.01) |
| *C01B 25/45* | (2006.01) |
| *H01M 4/58* | (2010.01) |
| *H01M 10/052* | (2010.01) |
| *H01M 4/62* | (2006.01) |

(52) U.S. Cl.
CPC ............... *H01M 4/366* (2013.01); *C01B 25/45* (2013.01); *H01M 4/5825* (2013.01); *H01M 4/625* (2013.01); *H01M 10/052* (2013.01)

(58) Field of Classification Search
CPC .  H01M 4/625; H01M 4/1397; H01M 10/052; C01B 25/45
USPC ................................ 252/182.1, 506; 423/306
See application file for complete search history.

(56) References Cited

U.S. PATENT DOCUMENTS

| 2007/0054187 A1 | 3/2007 | Nuspl et al. | |
| 2009/0117022 A1* | 5/2009 | Nuspl ..................... | C01B 25/45 423/306 |

FOREIGN PATENT DOCUMENTS

| CN | 101456549 B | 10/2010 |
| JP | 2009-231206 A | 10/2009 |
| JP | 2010-092599 A | 4/2010 |
| JP | 2010-251302 A | 11/2010 |

(Continued)

OTHER PUBLICATIONS

Haisheng Fang, et al., "Hydrothermal Synthesis of Electrochemically Active LiMnPO4", Chemistry Letter, 2007, pp. 436-437, vol. 36, No. 3.

(Continued)

*Primary Examiner* — Khanh Tuan Nguyen
(74) *Attorney, Agent, or Firm* — Sughrue Mion, PLLC (57) ABSTRACT

The present invention provides a method for producing a cathode-active material containing an olivine-type lithium metal phosphate for a lithium secondary battery which does not need washing or sintering after hydrothermal synthesis, the method including a step in which hydrothermal synthesis is carried out by using a mixture containing $HMnPO_4$ and a lithium source as a raw material to produce an olivine-type lithium metal phosphate.

7 Claims, 2 Drawing Sheets

(56) References Cited

FOREIGN PATENT DOCUMENTS

| | | |
|---|---|---|
| JP | 2010-272272 A | 12/2010 |
| JP | 2011-042553 A | 3/2011 |
| JP | 2011-049156 A | 3/2011 |
| JP | 2011-213587 A | 10/2011 |
| TW | 201114093 A1 | 4/2011 |
| WO | 97/40541 A1 | 10/1997 |
| WO | 03/012899 A1 | 2/2003 |
| WO | 2005/051840 A1 | 6/2005 |
| WO | 2009/144600 A2 | 12/2009 |
| WO | 2010/012076 A1 | 2/2010 |

OTHER PUBLICATIONS

Nam-Hee Kwon, et al., "Enhanced Electrochemical Performance of Mesoparticulate LiMnPO4 for Lithium Ion Batteries", Electrochemical and Solid-State Letter, 2006, pp. A277-A280, vol. 9, No. 6.

International Search Report for PCT/JP2012/060289, dated Jul. 3, 2012.

Office Action with a mailing date of Mar. 4, 2014 for corresponding Taiwanese Patent Application No. 101113945.

* cited by examiner

METHOD FOR PRODUCING CATHODE-ACTIVE MATERIAL FOR LITHIUM SECONDARY BATTERY

CROSS REFERENCE TO RELATED APPLICATIONS

This is a National Stage of International Application No. PCT/JP2012/060289, filed Apr. 16, 2012, claiming priority from Japanese Patent Application No. 2011-096280, filed Apr. 22, 2011, the contents of all of which are incorporated herein by reference in their entirety.

TECHNICAL FIELD

The present invention relates to a method for producing a cathode-active material for a lithium secondary battery.

Priority is claimed on Japanese Patent Application No. 2011-096280 filed Apr. 22, 2011, the contents of which are incorporated herein by reference.

BACKGROUND ART $LiMnPO_4$, which is one of olivine-type lithium metal phosphates, is cheaper than $LiCoO_2$, which has been widely used as a cathode-active material for a lithium secondary battery, and has higher energy density than that of $LiFePO_4$, which is an iron-based olivine-type lithium metal phosphate. Therefore, $LiMnPO_4$ is expected to be a cathode-active material for a lithium secondary battery, in particular, a large-sized lithium secondary battery for a vehicle.

As a method for producing $LiMnPO_4$, solid phase synthesis (Patent Document 1), hydrothermal synthesis (Patent Document 2 and Non-Patent Document 1), and a sol-gel method (Patent Document 2) are known. Among these methods, a hydrothermal synthesis which can produce $LiMnPO_4$ having a small particle diameter at relatively low temperatures within a short time is considered to be the best method.

PRIOR ART DOCUMENT

Patent Document

Patent Document No. 1: PCT International Publication No. WO 1997/040541
Patent Document No. 2: PCT International Publication No. WO 2005/051840

Non-Patent Document

Non-Patent Document No. 1: Chemistry Letters 36 (2007) 436
Non-Patent Document No. 2: Electrochemical and Solid-state Letters, 9 (2006) A277-A280

DISCLOSURE OF THE INVENTION

Problems to be Solved

However, $MnSO_4$, $MnCl_2$, $MnNO_3$, $(COO)_2Mn$ or the like is used as a Mn source in a conventional method for producing lithium metal phosphate, such as $LiMnPO_4$ using hydrothermal synthesis. Therefore, in order to obtain a haploid $LiMnPO_4$, the amount of Li needs to be sufficiently larger than that of Mn, and washing or sintering at high temperature, such as more than 300° C., after synthesis of $LiMnPO_4$ is also needed.

Examples of the hydrothermal synthesis method for $LiMnPO_4$ include a method in which magnesium sulfate, phosphoric acid, and excess amount of lithium hydroxide are mixed and subjected to hydrothermal synthesis. In this hydrothermal synthesis method, lithium sulfate is synthesized at the same time. Therefore, it is necessary to remove lithium sulfate by washing with water after hydrothermal synthesis. In addition, the solid phase synthesis method and the sol-gel method require sintering at high temperatures to obtain $LiMnPO_4$.

As explained above, washing or sintering is required in the conventional method for producing lithium metal phosphate, such as $LiMnPO_4$, and the method is troublesome.

In consideration of the above-described problems, the present invention is achieved.

Means for Solving the Problem (1) A method for producing a cathode-active material for a lithium secondary battery, wherein the method includes a step in which hydrothermal synthesis is carried out by using a mixture containing $HMnPO_4$ and a lithium source as a raw material to produce an olivine-type lithium metal phosphate.

(2) The method for producing a cathode-active material for a lithium secondary battery according to (1), wherein at least one of the group consisting of LiOH, $Li_2CO_3$, $CH_3COOLi$, and $(COOLi)_2$ is used as the lithium source.

(3) The method for producing a cathode-active material for a lithium secondary battery according to (1) or (2), wherein the temperature in the hydrothermal synthesis is 100° C. or more.

(4) The method for producing a cathode-active material for a lithium secondary battery according to any one of (1) to (3), wherein a carbon source is further added to the mixture as the raw material, and hydrothermally synthesized, a product obtained by the hydrothermal synthesis is heated in an inert gas atmosphere, and an olivine-type lithium metal phosphate having a carbon film on the surface thereof is produced.

(5) The method for producing a cathode-active material for a lithium secondary battery according to any one of (1) to (3), wherein a carbon source is added to an olivine-type lithium metal phosphate which is produced by the hydrothermal synthesis, and heated in an inert gas atmosphere, and an olivine-type lithium metal phosphate having a carbon film on the surface thereof is produced.

(6) The method for producing a cathode-active material for a lithium secondary battery according to (4) or (5), wherein at least one of the group consisting of sucrose, lactose, ascorbic acid, 1,6-hexandiol, polyethylene glycol, polyethylene oxide, carboxymethyl cellulose, carbon blacks, and fibrous carbons is used as the carbon source.

(7) The method for producing a cathode-active material for a lithium secondary battery according to any one of (1) to (6), wherein $MPO_4$ or $HM'PO_4$ (wherein M means Al or a rare-earth element, and M' means an element selected from the group consisting of Mg, Ca, Fe, Ni, Co, Zn, Ge, Cu, Cr, Ti, Sr, Ba, Sc, Y, Ga, In, Si, and B) is further added to the mixture as the raw material.

Effects of the Present Invention

According to the present invention, it is possible to provide a method for producing a cathode-active material for a lithium secondary battery including an olivine-type lithium metal phosphate which does not substantially need washing or sintering after hydrothermal synthesis.

DESCRIPTION OF EMBODIMENTS

Below, the method for producing a cathode-active material for a lithium secondary battery, a cathode-active material for a lithium secondary battery, and a lithium secondary battery in one embodiment of the present invention will be explained.

(Method for Producing a Cathode-Active Material for a Lithium Secondary Battery)

The method for producing a cathode-active material for a lithium secondary battery in the preferred embodiment of the present invention is a method including a step in which a mixture (abbreviated as "raw material for hydrothermal synthesis" below) containing $HMnPO_4$, a lithium source, and water is used as a raw material, and hydrothermal synthesis is carried out under pressurized conditions to produce a cathode-active material including an olivine-type lithium metal phosphate for a lithium secondary battery.

In addition, $MPO_4$ or $HM'PO_4$ (wherein M means Al or a rare-earth element, and M' means an element selected from the group consisting of Mg, Ca, Fe, Ni, Co, Zn, Ge, Cu, Cr, Ti, Sr, Ba, Sc, Y, Ga, In, Si, and B) may be further added to the raw material for hydrothermal synthesis in the preferred embodiment of the present invention.

Examples of $MPO_4$ or $HM'PO_4$ include $AlPO_4$, $RePO_4$ (Re means a rare-earth element), $HMgPO_4$, $HCaPO_4$, $HFePO_4$, $HNiPO_4$, $HCoPO_4$, $HZnPO_4$, $HGePO_4$, $HCuPO_4$, $HCrPO_4$, $HTiPO_4$, $HSrPO_4$, $HBaPO_4$, $HScPO_4$, $HYPO_4$, $HGaPO_4$, $HInPO_4$, $HSiPO_4$, and $HBPO_4$. The compound may be used alone or in combination of two or more.

Examples of the lithium metal phosphate produced by the method in the preferred embodiment according to the present invention include lithium metal phosphate represented by $Li_xMn_y(M,M')_zP_wO_4$. In the chemical formula, x, y, z, and w, which show a molar ratio, mean $0<x<2$, $0<y<1.5$, $0<z<1.5$ and $0.9<w<1.1$, and M and M' mean an element as explained above.

$HMnPO_4$, $MPO_4$, and $HM'PO_4$ used in the preferred embodiment of the method according to the present invention are a metal source and a P source, and melt in the hydrothermal synthesis.

It is preferable that a compound which can be melted in the hydrothermal synthesis be used as a Li source in the method of the preferred embodiment according to the present invention. Examples of the compound include LiOH, $Li_2CO_3$, $CH_3COOLi$, and $(COOLi)_2$. The compound may be used alone or in combination of two or more. Among these compounds, LiOH is preferably used.

The blending proportion between $HMnPO_4$, $MPO_4$, or $HM'PO_4$ and the Li source may be determined so as to match the stoichiometric ratio of the lithium metal phosphate to be produced, specifically, the lithium metal phosphate represented by $Li_xMn_y(M,M')_zP_wO_4$. For example, when the lithium metal phosphate represented by $LiMnPO_4$ is produced, the blending proportion may be determined so as to match the molar quantity of Li in the Li source and the molar quantity of P and Mn in $HMnPO_4$. Specifically, $HMnPO_4$ and the Li source may be blended such that the molar ratio (Li:Mn:P) between Mn, P, and Li in a mixture containing $HMnPO_4$ and the Li source is 1:1:1. Thereby, excess Li does not remain in the product after the hydrothermal synthesis. Due to this, washing of the product after hydrothermal synthesis is not necessary, and the production method can be simplified.

Water is a polar solvent, and used when $HMnPO_4$, $MPO_4$, or $HM'PO_4$ and the Li source are hydrothermally synthesized. Crystallization water in $HMnPO_4$, $MPO_4$, $HM'PO_4$ and/or the Li source may be used as the water. That is, when a sufficient amount of crystallization water is included in $HMnPO_4$, $MPO_4$, $HM'PO_4$ and/or the Li source, $HMnPO_4$, $MPO_4$, or $HM'PO_4$ and the Li source are hydrothermally synthesized without addition of water.

The amount of water added to the raw material for hydrothermal synthesis is preferably in a range of 10% by mass to 99% by mass, more preferably in a range of 24% by mass to 93% by mass, and most preferably in a range of 55% by mass to 80% by mass. When the amount of water added to the raw material for hydrothermal synthesis is in the range, the hydrothermal synthesis can proceed smoothly. In addition, the particle diameter of the lithium metal phosphate can be controlled by adjusting the amount of water added. When the amount of water added is smaller, the particle diameter of the lithium metal phosphate tends to be smaller. In contrast, when the amount of water added is larger, the particle diameter of the lithium metal phosphate tends to be larger. Therefore, the amount of water added can be adjusted depending on the particle diameter needed. However, when the amount of water added is extremely small, the particle diameter of the lithium metal phosphate also tends to be larger.

Examples of a polar solvent which can be used in the hydrothermal synthesis other than water include methanol, ethanol, 2-propanol, ethylene glycol, propylene glycol, acetone, cyclohexanone, 2-methylpyrolidone, ethyl methyl ketone, 2-ethoxyethanol, propylene carbonate, ethylene carbonate, dimethyl carbonate, dimethyl formaldehyde, and dimethyl sulfoxide. The polar solvent can be used alone or in combination of two or more instead of water, or in addition to water.

These raw materials are the main raw materials for hydrothermal synthesis in the preferred embodiment of the present invention. However, the following materials can be used in addition to these raw materials.

(Carbon Source)

In the method of the preferred embodiment according to the present invention, a compound as a carbon source can be also added to the raw material for hydrothermal synthesis, in order to form a carbon film on the surface of the particle of lithium metal phosphate. Water-soluble compounds can be used as the carbon source in the present invention. This is because washing with water after hydrothermal synthesis is not necessary in the preferred production method, and therefore, there is no fear that the carbon source is washed away. Thereby, it is possible to previously add the carbon source which is a water-soluble compound. Moreover, when the carbon source is used, sintering is necessary after hydrothermal synthesis as explained below.

Examples of the carbon source include saccharides, such as sucrose and lactose, ascorbic acid, 1,6-hexandiol, polyethylene glycol, polyethylene oxide, carboxymethyl cellulose, carbon blacks, and fibrous carbons. The carbon source can be used alone or in combination of two or more.

Moreover, reducing materials such as ascorbic acid can be used as the carbon source and an antioxidant for preventing oxidation of the raw material for hydrothermal synthesis.

Examples of such an antioxidant include tocopherol, dibutyl hydroxytoluene, butyl hydroxyanisole, and propyl gallate.

The amount of the carbon source added to the raw material for hydrothermal synthesis varies depending on the particle diameter of the lithium metal phosphate produced. However, the amount of the carbon source is preferably in a range of 0.05% by mass to 17% by mass, more preferably in a range of 0.15% by mass to 9% by mass, and most preferably in a range of 0.7% by mass to 7% by mass. When the amount of the carbon source is in the range, a sufficient amount of the carbon film can be formed.

The raw material for hydrothermal synthesis is prepared by mixing $HMnPO_4$, the lithium source, water, and if necessary, the carbon source, $MPO_4$, or $HM'PO_4$. Then, the mixture is hydrothermally synthesized to convert lithium metal phosphate at 100° C. or more, preferably 150° C. or more, and most preferably 175° C. or more. The upper limit of the temperature range is 300° C., and preferably 250° C. This conversion reaction is preferably carried out at 0.5 MPa or more, and more preferably in a range of 1 to 10 MPa. For example, the conversion reaction is carried out in a pressure-resistant reactor, such as an autoclave. The inside of the reactor is preferably replaced with an inert gas or reducing gas. Examples of the inert gas include nitrogen and argon.

When the reaction starts at 100° C. or more, the conversion reaction is finished while maintaining 100° C. or more. During the conversion reaction, it is preferable to sufficiently stir the raw material for hydrothermal synthesis. Through the conversion reaction, a solution in which lithium metal phosphate is suspended can be obtained. One example of the conversion reaction can be denoted by the following chemical formula.

$HMnPO_4 + LiOH \rightarrow LiMnPO_4 + H_2O$

Then, the suspended solution obtained is cooled to about room temperature, dried without washing in the conventional method, and hydrothermal synthesis product is obtained. During drying, it is preferable to select conditions in which the lithium metal phosphate is not oxidized. In order to dry, vacuum drying method is preferably used.

After that, the hydrothermal synthesis product after drying as it is sintered under inert gas atmosphere. In addition, in the case of the hydrothermal synthesis product obtained without addition of the carbon source in the raw material for the hydrothermal synthesis, the carbon source is added to the hydrothermal synthesis product after drying, and then, the mixture is sintered under inert gas atmosphere. The sintering temperature is preferably in a range of 500° C. to 800° C. When the sintering is carried out, lithium metal phosphate which is covered with the carbon film can be obtained. Thereby, conductivity can be applied to lithium metal phosphate as an insulating material.

The lithium metal phosphate obtained in this manner is an olivine-type and represented by $Li_xMn_y(M,M')_zP_wO_4$ (in the chemical formula, x, y, z, and w, which show a molar ratio, means $0<x<2$, $0<y<1.5$, $0\leq z<1.5$, and $0.9<w<1.1$). The composition ratio of the lithium metal phosphate can be adjusted by changing the blending ratio between $HMnPO_4$, $MPO_4$, or $HM'PO_4$ and the Li source.

(Cathode-Active Material for Lithium Secondary Battery)

The cathode-active material for a lithium secondary battery in the preferred embodiment of the present invention contains the lithium metal phosphate which is produced by the method explained above. The lithium metal phosphate is preferably covered with the carbon.

In addition, the average particle diameter $D_{50}$, which is the 50% volume cumulative diameter in the accumulation particle size distribution determined on a volume basis, of the lithium metal phosphate is preferably in a range of 0.01 to 1 µm, and more preferably in a range of 0.05 to 0.5 µm. The particle diameter of the lithium metal phosphate can be adjusted by the amount of water added to the raw material for hydrothermal synthesis, and the temperature, pressure, and stirring strength in the conversion reaction to the lithium metal phosphate. In addition, the adjustment is also possible by crushing and classifying the lithium metal phosphate obtained. Moreover, the particle diameter can be measured by a laser diffraction-light scattering method.

(Lithium Secondary Battery)

The lithium secondary battery in the preferred embodiment of the present invention includes a cathode, an anode, and nonaqueous electrolyte. In the lithium secondary battery, the lithium metal phosphate produced by the production method explained above is included in the cathode as a cathode-active material. It is possible to improve the energy density of the lithium secondary battery by using the lithium metal phosphate as a cathode-active material.

Below, the cathode, anode, and nonaqueous electrolyte which constitute the lithium secondary battery, are explained in this order.

(Cathode)

In the lithium secondary battery in the preferred embodiment of the present invention, a sheet-shape electrode which includes a cathode composite material containing the cathode-active material, a conductive assistant agent, and a binder, and a cathode current collector connected with the cathode composite material can be used as the cathode. In addition, it is also possible to use a pellet-shape or sheet-shape cathode which is formed by molding the cathode composite material in a pellet shape, or a sheet shape.

As the cathode-active material, the lithium metal phosphate produced by the method explained above is used. A well-known cathode-active material may be added to the lithium metal phosphate.

Examples of the binder include polyethylene, polypropylene, ethylene-propylene copolymer, ethylene-propylene terpolymer, butadiene rubber, styrene butadiene rubber, butyl rubber, polytetrafluoroethylene, poly(meth)acrylate, polyvinylidene fluoride, polyethylene oxide, polypropylene oxide, polyepichlorohydrin, polyphosphazene, and polyacrylonitrile.

Examples of the conductive assistant agent include conductive metal powder such as silver powder; conductive carbon powder such as furnace black, ketjen black, and acethylene black; carbon nanotube, carbon nanofiber, and carbon fiber produced by gas phase method. Among these, carbon fiber produced by gas phase method is preferable. The diameter of the carbon fiber produced by gas phase method is preferably in a range of 0.5 nm to 0.2 µm. The ratio (length/diameter) between length and diameter in the carbon fiber produced by gas phase method is preferably in a range of 5 to 1,000. The amount of the carbon fiber produced by gas phase method relative to the dry mass of the cathode composite material is preferably in a range of 0.1% by mass to 10% by mass.

Examples of the cathode current collector include conductive metal foil, conductive metal net, and punching metal of conductive metal. As the conductive metal, aluminum or an aluminum alloy is preferable.

In addition, the cathode composite material may contain ion-conductive material, thickener, dispersant, and/or unguent, if necessary. Examples of the ion-conductive material include polysaccharides such as chitin, and chitosan, and crosslinking product of the polysaccharides. Examples of the thickener include carboxymethyl cellulose, and polyvinyl alcohol.

For example, the cathode can be produced by coating a pasty cathode composite material on the cathode current collector, dried, and molded with pressure; or molding granular cathode composite material on the cathode current collector with pressure. The thickness of the cathode is generally in a range of 0.04 mm to 0.15 mm. It is possible to produce the cathode having a desired density by adjusting the pressure in the molding. The pressure in the molding is preferably in a range of about 1 t/cm$^2$ to about 3 t/cm$^2$.

(Anode)

A sheet-shape electrode which includes an anode composite material containing an anode active material, a binder, and if necessary, a conductive assistant agent, and a cathode current collector connected with the anode composite material can be used as the anode. In addition, it is also possible to use a pellet-shape or sheet-shape anode which is formed by molding the anode composite material in a pellet shape, or a sheet shape.

As the anode active material, any well-known anode active material can be used. Examples of the anode active material include carbon material such as artificial graphite, and natural graphite, and metal or semimetal such as Sn, and Si.

As the binder, the same materials as those used in the cathode can be used.

In addition, a conductive assistant agent may be added if necessary, and may not be added. Examples of the conductive assistant agent include conductive carbon powder such as furnace black, ketjen black, and acethylene black; carbon nanotube, carbon nanofiber, and carbon fiber produced by gas phase method. Among these, carbon fiber produced by gas phase method is preferable. The diameter of the carbon fiber produced by gas phase method is preferably in a range of 0.5 nm to 0.2 µM. The ratio (length/diameter) between length and diameter in the carbon fiber produced by gas phase method is preferably in a range of 5 to 1,000. The amount of the carbon fiber produced by gas phase method relative to the dry mass of the anode composite material is preferably in a range of 0.1% by mass to 10% by mass.

Examples of the anode current collector include conductive metal foil, conductive metal net, and punching metal of conductive metal. As the conductive metal, copper or a copper alloy is preferable.

For example, the anode can be produced by coating a pasty anode composite material on the anode current collector, dried, and molded with pressure; or molding granular anode composite material on the anode current collector with pressure. The thickness of the anode is generally in a range of 0.04 mm to 0.15 mm. It is possible to produce the anode having a desired density by adjusting the pressure in the molding. The pressure in the molding is preferably in a range of about 1 t/cm$^2$ to about 3 t/cm$^2$.

(Nonaqueous Electrolyte)

Nonaqueous electrolyte in which a lithium salt is dissolved in a non-protic solvent can be used as the nonaqueous electrolyte in the preferred embodiment.

Examples of the non-protic solvent include ethylene carbonate, diethyl carbonate, dimethyl carbonate, methyl ethyl carbonate, propylene carbonate, butylene carbonate, γ-butyrolactone, and vinylene carbonate. The solvent can be used alone or in combination of two or more.

In addition, examples of the lithium salt include $LiClO_4$, $LiPF_6$, $LiAsF_6$, $LiBF_4$, $LiSO_3CF_3$, $CH_3SO_3Li$, and $CF_3SO_3Li$.

In addition, so-called solid electrolyte or gel electrolyte can also be used as the nonaqueous electrolyte. Examples of the solid electrolyte and gel electrolyte include polymer electrolyte such as sulfonated styrene-olefin copolymer, polymer electrolyte containing polyethylene oxide and $MgClO_4$, and polymer electrolyte having a trimethylene oxide structure. Examples of the non-aqueous solvent used in the polymer electrolyte include ethylene carbonate, diethyl carbonate, dimethyl carbonate, methyl ethyl carbonate, propylene carbonate, butylene carbonate, γ-butyrolactone, and vinylene carbonate. The solvent can be used alone or in combination of two or more.

The lithium secondary battery of the preferred embodiment according to the present invention may include not only the cathode, anode, and nonaqueous electrolyte, but also another part if necessary. For example, the lithium secondary battery may include a separator for separating the cathode and the anode. The separator is necessary when the nonaqueous electrolyte is not a polymer electrolyte. Examples of the separator include nonwoven fabric, woven fabric, a film having ultrafine pores, and a composite thereof. Specifically, porous polypropylene film, porous polyethylene film, and the like can be suitably used.

The lithium secondary battery in the preferred embodiment of the present invention can be used in various technical field, for example, a personal computer, a tablet-type computer, a note-type computer, a mobile phone, a radio, an electronic databook, an electronic dictionary, PDA (Personal Digital Assistant agent), an electronic meter, an electronic key, an electronic tag, a power storage facility, an electric tool, a toy, a digital camera, a digital video, an audio visual system, an electrical and electronic device such as cleaner, a transport facility such as an electrically powered car, a hybrid car, an electrically powered bike, hybrid bike, an electrically powered bicycle, an electric assistant agent bicycle, a railway transportation, an airplane, and a ship, and a power generating system such as a photovoltaic power generation system, a wind turbine generation system, a tidal power generation system, a geothermal power generation system, a heat difference generation system, and a vibration power generation system.

As explained above, the mixture containing $HMnPO_4$, the lithium source, and water is used as the raw material for hydrothermal synthesis in the method for producing a cathode-active material for a lithium secondary battery in the preferred embodiment of the present invention. Therefore, the method of the preferred embodiment does not produce lithium sulfate as a by-product, in contrast to the conventional hydrothermal synthesis which uses manganese sulfate, and the like. Washing is essentially not needed after hydrothermal synthesis in the present invention, and thus the method is simplified. In addition, the method of the preferred embodiment, in which hydrothermal synthesis is carried out using $MPO_4$ or $HM'PO_4$, can be carried out at a lower reaction temperature than the method using hydrothermal synthesis with conventional raw materials.

In addition, at least one of LiOH, $Li_2CO_3$, $CH_3COOLi$, and $(COOLi)_2$ is used as the lithium source in the method for producing a cathode-active material for a lithium secondary battery in the preferred embodiment of the present invention. Therefore, hydrothermal synthesis can be easily carried out.

It is possible to easily carry out hydrothermal synthesis by adjusting the temperature to 100° C. or more in the method for producing a cathode-active material for a lithium secondary battery in the preferred embodiment of the present invention.

Washing after hydrothermal synthesis is not necessary in the method for producing a cathode-active material for a lithium secondary battery in the preferred embodiment of the present invention. Therefore, it is possible to carry out hydrothermal synthesis by adding a carbon source, and then sinter to form a carbon film. The method is thus simplified.

In addition, it is also possible to add and mix a carbon source with a hydrothermal synthesis product, and heat the mixture in an inert gas atmosphere. Therefore, it is possible to produce an olivine-type lithium metal phosphate of which the surface is covered with a carbon film.

Furthermore, it is possible to easily form a carbon film by using sucrose, lactose, ascorbic acid, 1,6-hexandiol, polyethylene glycol, polyethylene oxide, carboxymethyl cellulose, carbon blacks, and fibrous carbons as the carbon source.

The cathode-active material for a lithium secondary battery obtained by the method in the preferred embodiment of the present invention has an extremely lower amount of by-product than that of the conventional method using conventional lithium metal phosphate. That is, the cathode-active material obtained by the method in the preferred embodiment of the present invention has high purity. Due to this, it is possible to improve the charge-discharge capacity per mass.

Furthermore, the lithium secondary battery in the preferred embodiment of the present invention includes a cathode-active material. Therefore, high energy density can be achieved.

EXAMPLES

Example 1

1. Hydrothermal Synthesis Step 14.99 g of $HMnPO_4 \cdot nH_2O$ (Soekawa Chemical Co., Ltd.; 80.4% as anhydrite), 3.37 g of $LiOH \cdot H_2O$ (Kanto Kagaku; grade G), 0.14 g of ascorbic acid, and 1.25 g of sucrose as a carbon source were mixed and crushed with an alumina mortar in a glove box, the inside of which was replaced with argon gas, and thereby a raw material for hydrothermal synthesis was obtained.

Then, the crushed raw material for hydrothermal synthesis was put in a 100 ml-sample container made of PTFE, and this container was put in a pressure-resistant outer casing made of stainless steel (HUS-100), and a lid is closed.

After that, the pressure-resistant outer casing was put in an autoclave, and the temperature was raised to 200° C. over 1 hour and maintained at 200° C. for 12 hours to carry out hydrothermal synthesis. After maintaining for 12 hours, heating was stopped, and the casing was allowed to cool to room temperature.

Then, a suspended solution containing the hydrothermal synthesis product was removed from the casing. Then, the suspended solution was dried at 95° C. in a vacuum dryer. Thus, lithium metal phosphate was produced.

2. Carbon Film Formation Step 1.0 g of the lithium metal phosphate was put on an alumina boat, and the alumina boat was placed in a quartz tube furnace having a diameter of 80 mm. Then the temperature inside the tube furnace was raised to 400° C. at 100° C./hour while passing nitrogen through the furnace at 1 L/min. The furnace was maintained under a nitrogen stream at 400° C. for 1 hour. Thereby, the gas generated from sucrose decomposition was discharged from the system. Then, the temperature inside the furnace was raised to 700° C. at 100° C./hour, and the furnace was maintained at 700° C. for 4 hours under a nitrogen stream. Subsequently, the furnace was cooled under a nitrogen stream to reach 100° C. or less. Then, the sintered product was removed from the furnace, and thereby a cathode-active material was obtained.

3. Cathode and Battery Production Step 0.473 g of the cathode-active material, 0.125 g of carbon (Timcal Graphite & Carbon; KS6L) as a conductive assistant agent, 0.062 g of polyvinylidene fluoride (Kureha corporation; KF polymer W#1300) as a binder were weighed, and sufficiently mixed. Then, 0.94 g of N-methyl-2-pyrrolidone (Kishida Chemical Co., Ltd.) was added a small amount at a time, then mixed thoroughly to obtain a coating mixture. The coating mixture was coated on Al foil having a thickness of 20 µm with a doctor blade having an adjusted gap. N-Methyl-2-pyrrolidone was volatilized from the resulting coating. The resultant was cut out in a circle having a diameter of 15 mm. The circle-shape sample was then pressed under 3 MPa for 20 seconds, and the thickness of the coating was measured. The average thickness of the coating was 53 µm. The weight of the coating was 11 mg. A cathode was thus produced.

The cathode was put into a glove box, the inside of which was replaced with argon, and the dew point was adjusted to −75° C. or less. Then, the cathode was put on a lid (Hohsen Corp.) of a 2320-coin-type battery, and an electrolyte (1M, $LiPF_6$ EC:MEC=40:60) was applied. A separator (CELGARD® 240) having a diameter of 20 mm and a metal lithium foil having a diameter of 17.5 mm were then superimposed in this order. Subsequently, a coin-type battery having a diameter of 23 mm and a thickness of 2 mm was produced by capping with a lid having a gasket, and swaging.

After that, a charge-discharge cycle test using the battery was carried out to evaluate the battery. The charge-discharge cycle test is explained below.

Example 2

A coin-type battery was produced and the charge-discharge cycle test was carried out in a manner identical to that of Example 1 except that the carbon source was not added to the raw material for hydrothermal synthesis, and sintering was not carried out after hydrothermal synthesis.

Example 3

A coin-type battery was produced and the charge-discharge cycle test was carried out in a manner identical to that of Example 1 except that 10 ml of pure water was added to the raw material for hydrothermal synthesis.

Example 4

A coin-type battery was produced and the charge-discharge cycle test was carried out in a manner identical to that of Example 1 except that $Li_2CO_3$ was used instead of $LiOH \cdot H_2O$ as the lithium source.

Example 5

A coin-type battery was produced and the charge-discharge cycle test was carried out in a manner identical to that of Example 1 except that the temperature at the hydrothermal synthesis was changed to 100° C.

Example 6

A coin-type battery was produced and the charge-discharge cycle test was carried out in a manner identical to that of Example 1 except that 12.49 g of $HMnPO_4 \cdot n\ H_2O$, 2.32 g of $HMgPO_4 \cdot 3H_2O$ (Kanto Kagaku; first grade), 3.37 g of $LiOH \cdot H_2O$ (Kanto Kagaku; grade G), 0.14 g of ascorbic acid, and 1.25 g of sucrose as a carbon source were mixed and crushed with an alumina mortar, and thereby a raw material for hydrothermal synthesis was obtained.

Comparative Example

In a glove box filled with argon gas, argon gas was bubbled into distilled water for 15 hours to remove carbon dioxide gas and oxygen dissolved in the distilled water. 0.12 g of L(+)-ascorbic acid (Kanto Kagaku; grade G) was dissolved in 30 ml of the deaerated water, and then 16.86 g of $MnSO_4 \cdot 5H_2O$ (Kanto Kagaku; grade G) was also dissolved. Subsequently, 8.06 g of $H_3PO_4$ (Kanto Kagaku; grade G; 85.0%) was dissolved, and thereby a solution A was obtained.

Next, 8.81 g of $LiOH \cdot H_2O$ (Kanto Kagaku; grade E) was dissolved in 20 ml of the deaerated water subjected to the bubbling treatment as explained above. Thereby a solution B was obtained. pH of the solution B was 14.

The solutions A and B were mixed and stirred for 10 minutes in a glove box filled with argon gas. The mixture was poured into a 100-ml-sample container made of PTFE, put in a pressure-resistant outer casing made of stainless steel (HUS-100), and the lid was closed.

After that, the pressure-resistant outer casing was put in an autoclave, the temperature was raised to 200° C. over 1 hour, and maintained at 200° C. for 7 hours to carry out hydrothermal synthesis. After maintaining for 7 hours, heating was stopped, and the temperature was decreased to room temperature.

After cooling to room temperature, a suspended solution was removed from the autoclave and subjected to solid-liquid separation with a centrifuge. The supernatant solution was discharged, then distilled water was added and stirred for redispersion. The dispersion was subjected to solid-liquid separation by centrifuge, and then the supernatant solution was discharged again. This operation was repeated until the electronic conductivity of the supernatant was $1 \times 10^{-4}$ S/cm or less. After that, the resulting solid material was dried in a vacuum dryer in which the temperature was controlled at 90° C. Lithium metal phosphate was thus produced.

0.5 g of sucrose was added to 5.0 g of the dried lithium metal phosphate, and 2.5 ml of distilled water was further added, and mixed. Then, the mixture was dried in a vacuum dryer in which the temperature was controlled at 90° C. The dried material was put on an alumina boat, and the alumina boat was placed in a quartz tube furnace having a diameter of 80 mm. Then sintering was carried out in a manner identical to that of Example 1, and the sintered material was removed from the quartz tube furnace. Thereby, a cathode-active material was produced.

After that, a coin-type battery was produced using the cathode-active material and a charge-discharge cycle test was carried out in a manner identical to that of Example 1.

(Evaluation of Material)

Figure 1:
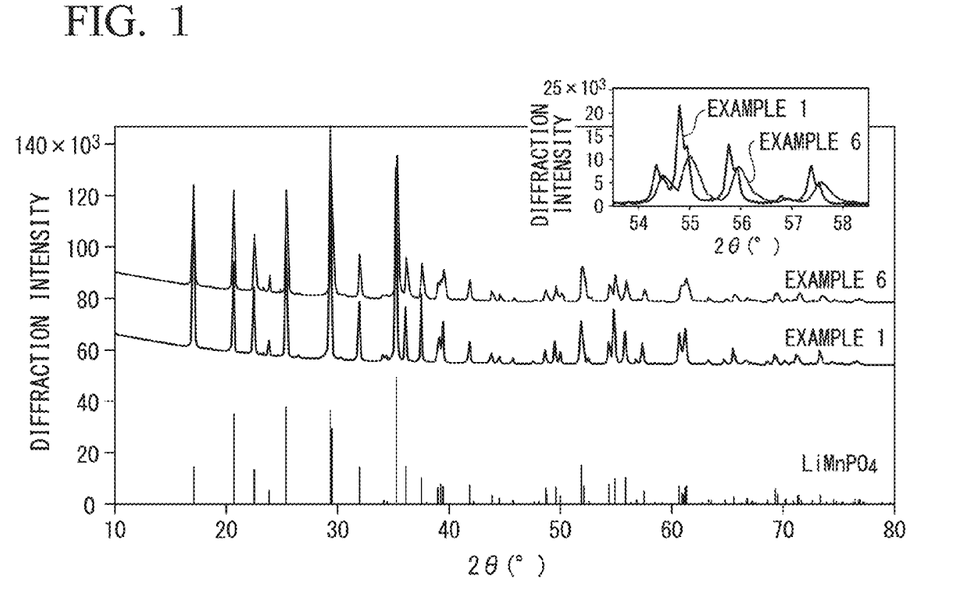
FIG. 1 shows the results of X-ray diffraction measurement of a cathode-active material of Example 1.

The cathode-active material obtained in Example 1 was measured by an X-ray diffraction method using CuKα ray (Rigaku Corporation; SmartLab). As shown in FIG. 1, the generation of $LiMnPO_4$ was confirmed. The unit on the vertical axis of FIG. 1 shows diffraction intensity (cps). At the bottom of FIG. 1, diffraction lines (2θ) of $LiMnPO_4$ displayed in JCPD card (#81-1173) are shown. The diffraction lines were substantially the same as those of the cathode-active material in Example 1. Similarly to Example 1, the generation of $LiMnPO_4$ was confirmed in the cathode-active material of Examples 2 to 5. A single phase of $LiMnPO_4$ was produced in all samples without washing. Moreover, shift of a peak was confirmed in Example 6. This shift was likely caused by the presence of Mg and Mn in solution.

Figure 2:
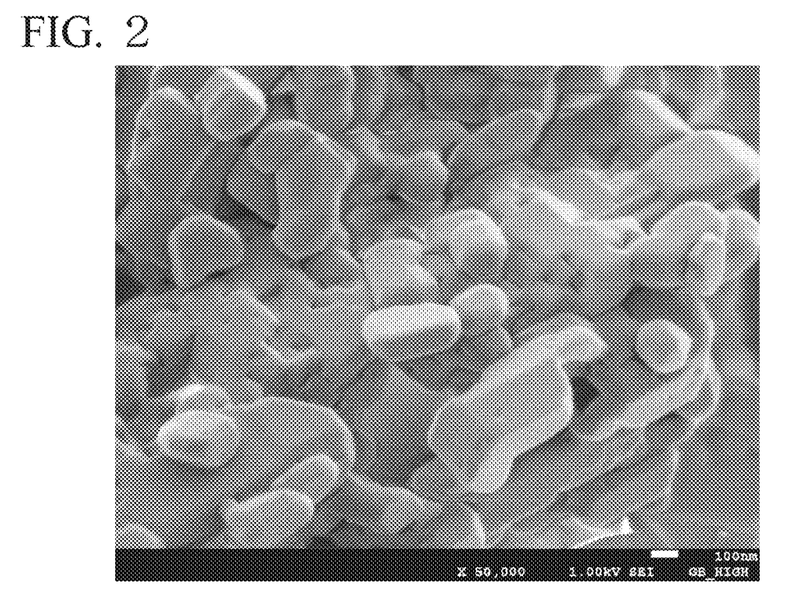
FIG. 2 is a SEM image of the cathode-active material of Example 1.
Figure 3:
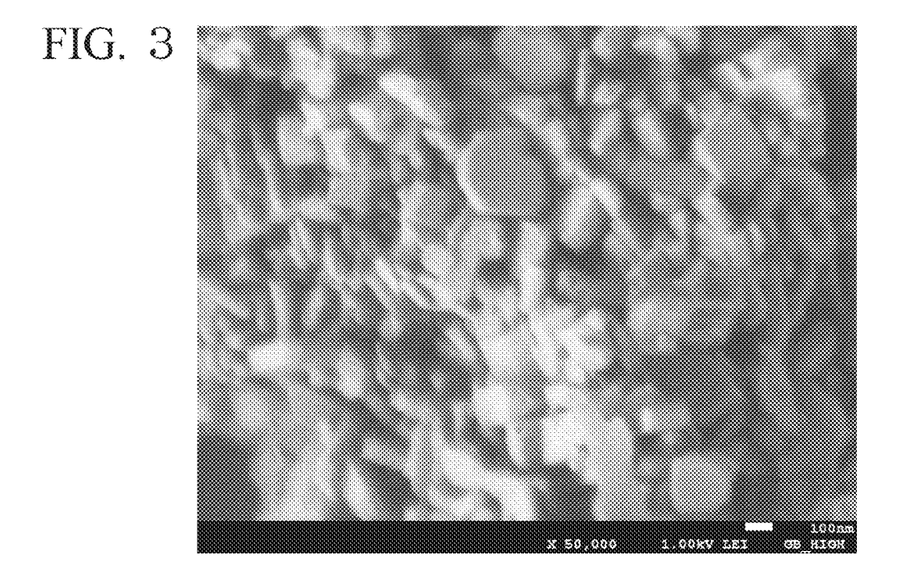
FIG. 3 is a SEM image of the cathode-active material of Example 3.

In addition, scanning electron microscope (SEM) images of the cathode-active material in Examples 1 and 3 are shown in FIGS. 2 and 3. According to FIGS. 2 and 3, the particle diameter of the cathode-active material could be compared, and it was found that the particle diameter of the cathode-active material in Example 3 was smaller than that of the cathode-active material in Example 1. Based on the results, it was confirmed that the particle diameter of $LiMnPO_4$ could be controlled by adjusting the composition of the raw material for hydrothermal synthesis.

(Evaluation of Battery)

Figure 4:
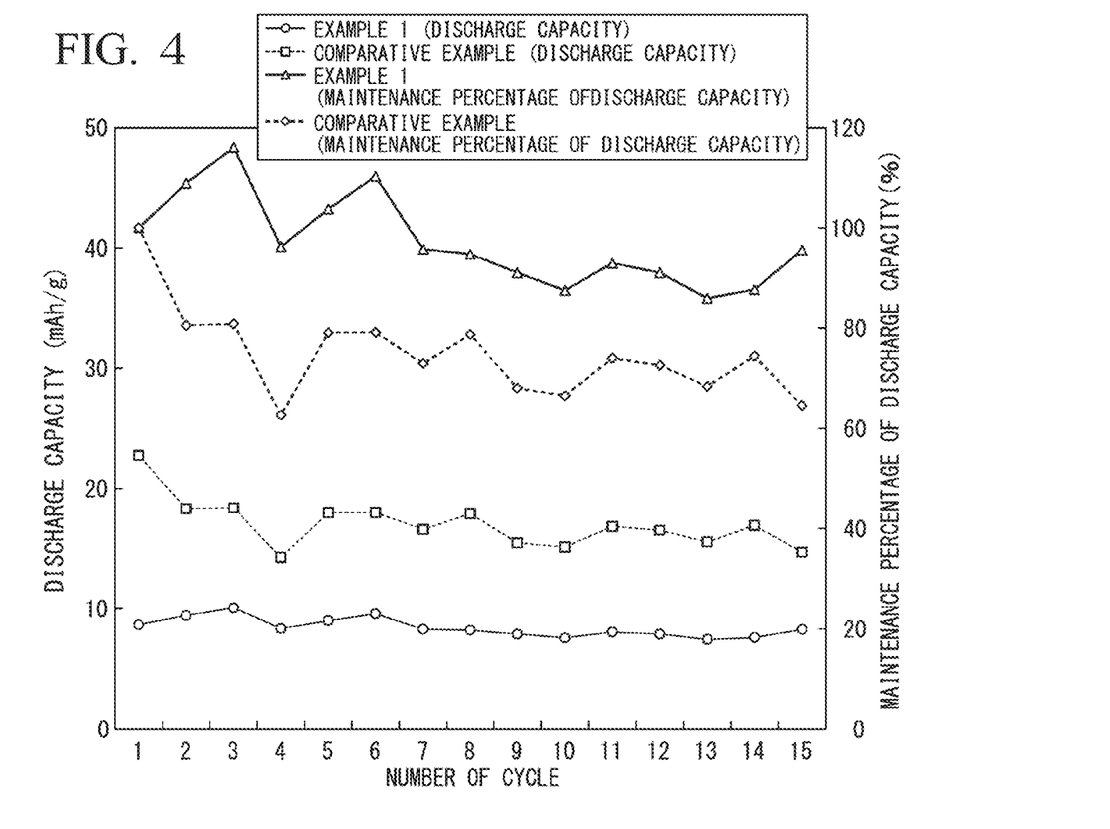
FIG. 4 shows the results of a charge-discharge cycle test of a coin-type battery in Example 1 and Comparative Example.

The coin-type battery obtained in Example 1 and Comparative Example was charged to 4.5V with constant current at a current value of 0.1 C at 25° C., and then charged to 0.01 C with constant voltage at a voltage value of 4.5 V. After that, the battery was discharged to 2.5 V. This operation was repeated 15 times. The relationship between discharge capacity, maintenance percentage of discharge capacity, and the number of charge-discharge cycles is shown in FIG. 4. In addition, the discharge capacity and maintenance percentage of discharge capacity of the coin-type battery in Examples 1 to 6 and Comparative Example after 15 cycles are shown in Table 1. The discharge capacity is a discharge capacity per mass of the cathode-active material. In addition, the maintenance percentage of discharge capacity is a percentage of the discharge capacity at 15 cycles relative to the discharge capacity at 1 cycle.

Based on these results, it was confirmed that the initial cycle properties in Examples 1 to 6 were excellent. The surface conditions of $LiMnPO_4$ are thus considered preferable in terms of battery properties compared with Comparative Example, in which the particle was washed.

TABLE 1

| | Discharge capacity (mAh/g) | Maintenance percentage of discharge capacity (%) |
|---|---|---|
| Example 1 | 8.3 | 95.6 |
| Example 2 | 7.6 | 93.2 |
| Example 3 | 18.1 | 94.2 |
| Example 4 | 8.1 | 94.5 |
| Example 5 | 7.1 | 95.8 |
| Example 6 | 20.3 | 93.5 |
| Comparative Example | 13.7 | 64.6 |

INDUSTRIAL APPLICABILITY

The present invention can be used in a method for producing a cathode-active material for a lithium secondary battery which does not need a washing step or sintering step. Therefore, the method of the present invention is simple. In addition, the method according to the present invention provides a cathode-active material having excellent electrical properties.

The invention claimed is:
1. A method for producing a cathode-active material for a lithium secondary battery, wherein the method includes a step in which hydrothermal synthesis is carried out by using a mixture containing $HMnPO_4$ and a lithium source as a raw material to produce an olivine-type lithium metal phosphate.

2. The method for producing a cathode-active material for a lithium secondary battery according to claim 1, wherein at least one of the group consisting of LiOH, $Li_2CO_3$, $CH_3COOLi$, and $(COOLi)_2$ is used as the lithium source.

3. The method for producing a cathode-active material for a lithium secondary battery according to claim 1, wherein the reaction temperature in the hydrothermal synthesis is 100° C. or more.

4. The method for producing a cathode-active material for a lithium secondary battery according to claim 1, wherein a carbon source is further added to the mixture as the raw material, and hydrothermally synthesis is carried out, a product obtained by the hydrothermal synthesis is heated in an inert gas atmosphere, and an olivine-type lithium metal phosphate having a carbon film on the surface thereof is produced.

5. The method for producing a cathode-active material for a lithium secondary battery according to claim 1, wherein a carbon source is added to an olivine-type lithium metal phosphate which is produced by the hydrothermal synthesis, and heated in an inert gas atmosphere, and an olivine-type lithium metal phosphate having a carbon film on the surface thereof is produced.

6. The method for producing a cathode-active material for a lithium secondary battery according to claim 4, wherein at least one of the group consisting of sucrose, lactose, ascorbic acid, 1,6-hexandiol, polyethylene glycol, polyethylene oxide, carboxymethyl cellulose, carbon blacks, and fibrous carbons is used as the carbon source.

7. The method for producing a cathode-active material for a lithium secondary battery according to claim 1, wherein MPO4 or HM'PO4 is further added to the mixture as the raw material, wherein M is selected from the group consisting Al or a rare-earth element, and M' is selected from an element consisting of Mg, Ca, Fe, Ni, Co, Zn, Ge, Cu, Cr, Ti, Sr, Ba, Sc, Y, Ga, In, Si, and B is further added to the mixture as the raw material.

* * * * *